Aug. 28, 1962
E. M. TUCKER, SR
3,051,531
ENDLESS TRACK UNIT
Filed Sept. 6, 1961
2 Sheets-Sheet 1
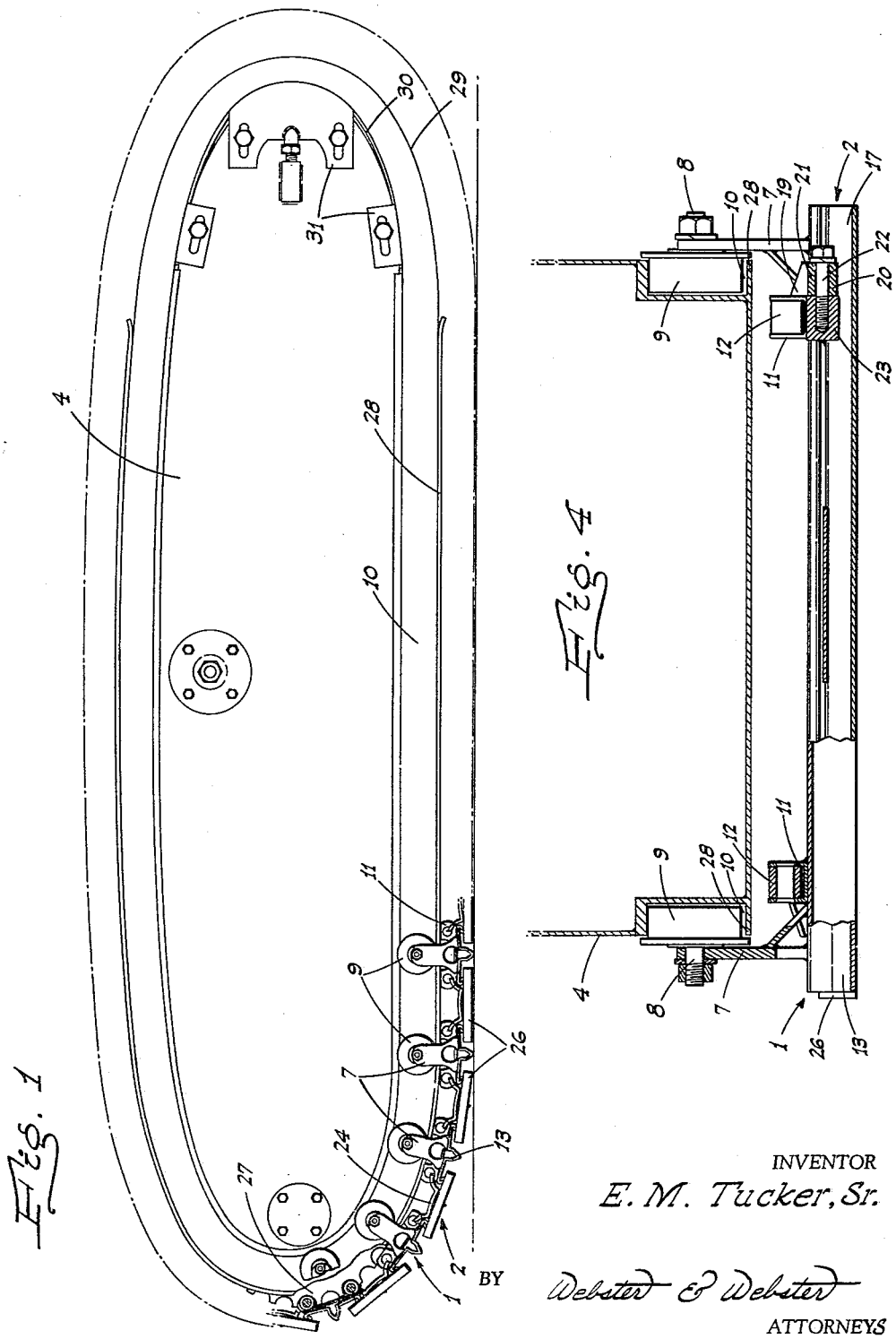
INVENTOR
*E. M. Tucker, Sr.*
BY *Webster & Webster*
ATTORNEYS

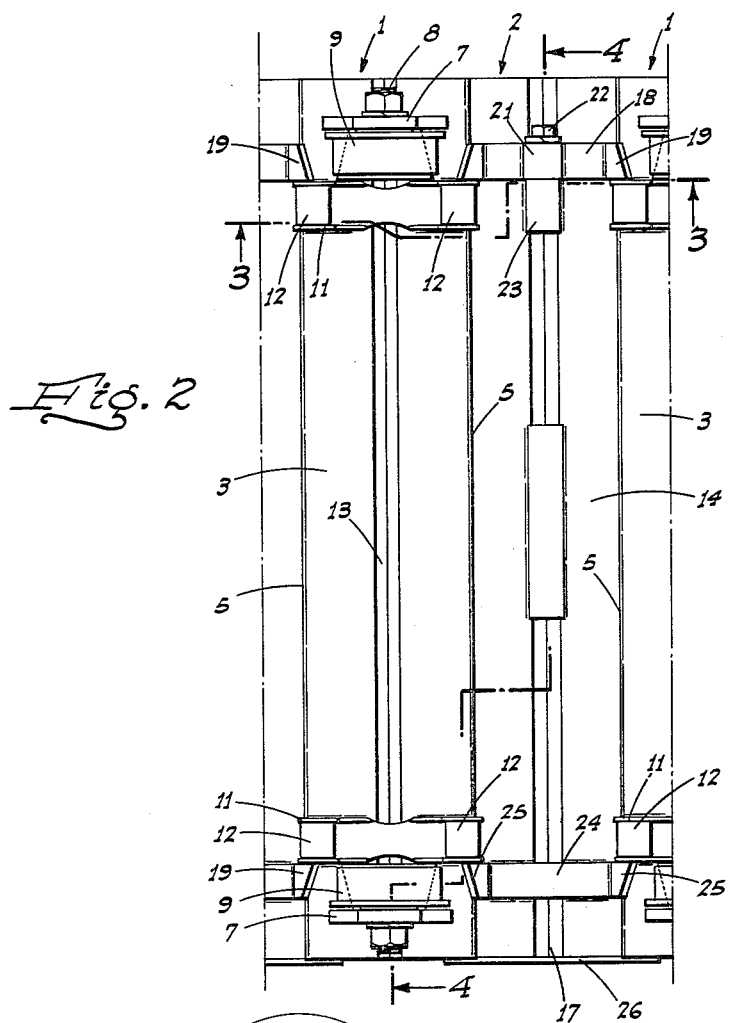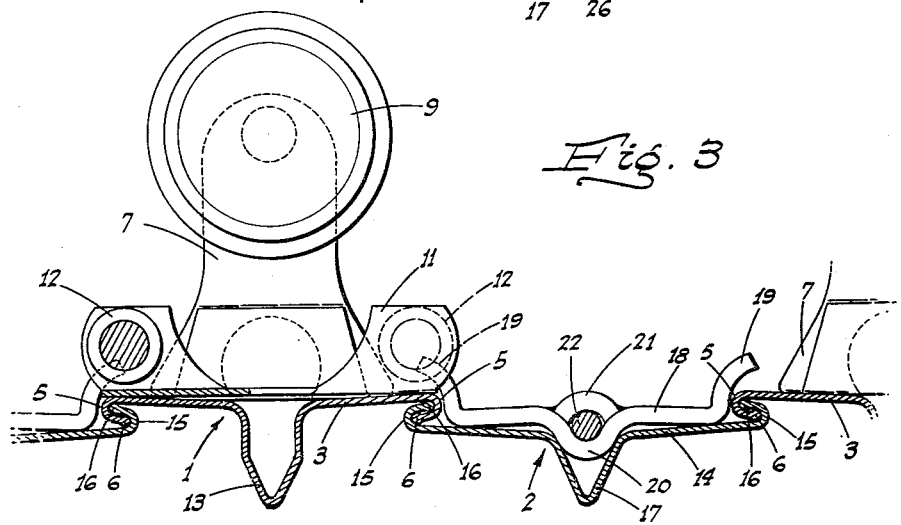

United States Patent Office 3,051,531
Patented Aug. 28, 1962

3,051,531
ENDLESS TRACK UNIT
Emmitt M. Tucker, Sr., Medford, Oreg., assignor to Tucker & Sons, Grass Valley, Calif., a corporation of California
Filed Sept. 6, 1961, Ser. No. 136,354
6 Claims. (Cl. 305—50)

This invention relates to endless track units, and particularly to one initially developed for use and mounting on the pontoons of a snow traversing vehicle of the type now on the market and known as a SNO-CAT.

The major object of this invention is to provide an endless track unit so constructed that a readily disengageable operative connection between adjacent track links is obtained, and a locking means which only requires a single bolt or screw to lock the links against disengagement and separation.

With regard to the above feature it is another object of the invention to provide such connection in the form of full-width cooperating draft hooks on the ends of adjacent links; the locking means preventing lateral movement of the links and their hooks relative to each other, while not interfering in any way with the necessary swivel movement of the links as the endless track unit passes about the rounded end portions of the pontoon.

Alternate links of the endless track unit are provided with rollers to engage the endless rails on the pontoon, and with other rollers to engage the drive sprocket wheels which are mounted in the pontoon. With these features in mind it is a further object of the invention to dispose all such rollers on each link so that they are protected from direct contact with the snow or ground, and thus are subjected to a minimum of abrasion and wear generally.

Thus, while the track unit has been initially designed for use in snow, as previously stated, it may also be effectively operated in mud or heavy ground generally.

It is also an object of the invention to provide a practical, reliable, and durable endless track unit, and one which will be exceedingly effective for the purpose for which it is designed.

These objects are accomplished by means of such structure and relative arrangement of parts as will fully appear from a perusal of the following specification and claims.

In the drawings:

FIG. 1 is a side elevation, partly diagrammatic, of the improved endless track unit as mounted on a pontoon of a certain type of vehicle.

FIG. 2 is an enlarged fragmentary top plan view of the track unit, showing an adjacent connected pair of track links.

FIG. 3 is a fragmentary enlarged longitudinal section on line 3—3 of FIG. 2.

FIG. 4 is a cross section on line 4—4 of FIG. 2, shown in connection with a supporting pontoon.

Referring now more particularly to the drawings, the endless track unit comprises a plurality of main track sections or links 1 and a like number of secondary or connecting sections or links 2 arranged in alternating relation to the links 1.

Each link 1 comprises a full-width tread plate 3 somewhat wider than the pontoon 4 on which the track unit is mounted. At each end the plate 3 is formed with downturned draft hooks 5 extending the full width of the plate. These hooks face each other below the plate in generally parallel relation thereto, and are formed with enlarged rounded tips 6, as shown in FIG. 3.

Upstanding from the plate 3 adjacent but short of the ends thereof are brackets 7, disposed in planes lengthwise of the track unit, and forming supports for the axial pins 8 of rollers 9 which are disposed laterally inward of the brackets. These rollers are flanged about their laterally outer edges and ride in channel-shaped tracks or rails 10 formed in the sides of the pontoon adjacent the periphery thereof and of course extending all about the same.

Adjacent but laterally inward from the rollers, upstanding channel bars 11 span the plate 3 from front to back and are welded or otherwise secured thereon. These channels support rollers 12 therein adjacent their ends, and which do not contact the pontoon, as clearly shown in FIG. 4. The tread plate 3 is formed with a full-width, centrally located, depending traction cleat 13.

Each track link 2 comprises a tread plate 14 of the same general dimensions as plate 3. Plate 14 is formed at its ends with full-width, upturned draft hooks 15 which face each other above the plate and—like the hooks 5—are formed with enlarged rounded tips 16. The hooks 5 and 15 are thus disposed in inverted cooperating relation to each other; the tips 6 of hooks 5 turnably seating in the hooks 15 at the bottom thereof, while the tips 16 of hooks 15 turnably seat in the hooks 5 in the bottom thereof. The hooks are of course shaped so that the link plates of adjacent links may have a certain amount of swivel movement relative to each other, as is necessary to enable the endless track unit as a whole to pass about the curved end portions of the pontoon rails 10.

The link plate 14 is formed with a full-width, centrally disposed, depending traction cleat 17 somewhat shallower than cleat 13 to compensate for the difference in level of the link plates 3 and 14 when connected together.

Means is provided to prevent lateral sliding of plates 3 and 14 relative to each other, while enabling said plates to be readily disengaged when desired or necessary, as for the replacement of a damaged link, or when the endless track unit is to be mounted on or removed from the pontoon.

Such means comprises, adjacent one side of plate 14, a cross locking bar 18 resting on said plate with its ends 19 bent away from plate 14 to avoid the hooks 5 of the plates 3 of adjacent links 1, and engaging the laterally outer sides of the related channels 11 of said links 1, as shown in FIG. 2.

The locking bar 18 is not secured of itself directly on plate 14, and centrally of its ends is formed with a depressed portion 20 which projects into the hollow cleat 17 in locating and slidable relationship, as shown in FIG. 3.

The bar 18, over and in connection with such depressed portion 20, is formed as a sleeve or bearing 21 for a cap screw 22. This screw, which extends horizontally and transversely of the link or track unit, is adapted to removably screw into an elongated boss or nut 23 welded to plate 14 laterally inward of and contacting bar 18.

Another cross bar 24 generally similar in form to bar 18 is secured, as by welding, on plate 14 adjacent the other side thereof, with its bent or deflected end portions 25 engaging the laterally outer sides of the related channel members 11 of the adjacent links 1.

It will therefore be seen that when the detachable bar 18 is mounted in place by screw 22, the link 2 is positively held against movement relative to the adjacent links 1 in a direction transversely of the track unit. When, however, the bar 18 is removed, link 2 may be slid lengthwise of itself from between the adjacent links 1 so that the track unit is then no longer endless and may be readily mounted on or removed from the pontoon 4.

It will be noted that the deflected ends 19 of cross bar 18, while clearing the adjacent hooks 5 so as to allow of the necessary swivel movement of links 1 and 2 relative to each other, prevent any appreciable relative movement of said links toward each other or lengthwise of the track unit, and thus prevent separation of the links by disengagement of the cooperating hooks thereof.

Each link 2, on the side thereof opposite the removable locking bar 18, is provided with a cross bar 26 set on edge along the link and depending from the tread plate 14 to adjacent the bottom level of the cleat 17, to which bar 26 is welded. This bar, which is preferably somewhat longer than the extent of link 2 lengthwise of the track unit as shown in FIG. 1, forms an effective traction cleat which prevents side-slipping of the track unit on ice and while traversing steep slopes on hard surfaces.

The rollers 12 on the links 1 are arranged for engagement with driving sprocket wheels 27 mounted in the pontoon 4 at one end thereof in any suitable manner.

In order to provide for easy mounting of the track unit on, or the removal of the same from, the pontoon, the flange 28 which forms the outer wall of the roller receiving rail or track 10 is cut away about the other end of the pontoon, as indicated at 29 in FIG. 1. This of course provides for the ready entry of the link rollers 9 in succession into the open end of the channel 10 when one link 2 has been detached and the track unit is laid out flat.

The inner flange of the channel 10, along the open portion thereof, is in the form of a suitably curved spring strip 30 connected at intervals to side plates 31 which overlap and are adjustably secured to the side walls of the pontoon, as indicated. This arrangement enables the central portion of strip 30 to be advanced or retracted lengthwise of the pontoon and thereby alter the tension of the track unit as may be required to give the smoothest and most efficient track action.

From the above description it will be seen that the full-width draft hooks, which form the sole connection between adjacent links lengthwise of the track unit, distribute the pulling pressure and wear on the links evenly throughout their full width, and wear is thus greatly lessened.

In connection with this feature it will be seen that the channels 11 to which the sprocket wheels 27 are applied, being welded to the tread plate 3 across the depending hollow cleat 13, prevent possible spreading of any link 1 lengthwise of the track unit by the pulling pressure exerted on said link when on the lower run of the track unit. Similarly, spreading of any link 2 by a like pressure is prevented by the cross bar 24 and boss 23, which are welded to the tread plate 14 across or in the hollow cleat 17.

At the same time, it will be seen that no draft pull is ever placed on the locking screw or bolt 22; the latter having only to resist a tensional pull exerted thereon laterally of the link.

By reason of the fact that the tread plate 3 of each link 1 is solid from side to side, and is wider than the pontoon, that rollers 9 are above such plate (when on the lower ground-engaging run of the track), and that the sprocket-wheel engaging rollers 12 are practically enclosed in the channels 11, which are not only above plate 3 but back of the adjacent brackets 7, it will be clear that all such rollers are protected from contact with the ground over which the track unit may be riding.

Such protective action is also enhanced by the full-width continuous hook connection between the links, and which forms a complete closure across the links and prevents any dirt from passing up therebetween.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An endless track unit comprising a plurality of links, means on alternate links for engagement with a supporting structure, cooperating hooks on the adjacent ends of all the links connecting the links together in relatively swivel and draft relationship, the hooks of adjacent links being arranged for disengagement from each other by transverse movement of one of such links in one direction relative to each other, and releasable means on and engaging said adjacent links preventing such movement of the links.

2. An endless track unit comprising a plurality of links, means on alternate links for engagement with a supporting structure, each link including a tread plate and cooperating hooks formed on the ends of the tread plates of all the links and connecting the same together in draft relationship, the hooks of adjacent plates being arranged for disengagement from each other by transverse movement of one such plate relative to the other plate in one direction, and cooperating locking elements on adjacent plates preventing such relative movement thereof; one such element being detachable and then rendering the locking means ineffective and permitting of such movement of the plates.

3. An endless track unit comprising a plurality of links, means on alternate links for engagement with a supporting structure, each link including a tread plate and cooperating hooks formed on the ends of the tread plates of all the links and connecting the same together in draft relationship, the hooks of adjacent plates being arranged for disengagement from each other by relative transverse movement of such adjacent plates, bars fixed on one of such plates adjacent the sides thereof and extending lengthwise of the track unit, a locking bar fixed on the other one of said plates and overlapping one of the first named bars and engaging the same on its laterally outer face, another locking bar on said other plate overlapping the other one of the first named bars and engaging the laterally outer face thereof, and means removably securing said other locking bar on said other plate.

4. A structure, as in claim 3, in which the last named means comprises a tapped boss secured on said other plate and engaging the other locking bar on the laterally inner side thereof, and a bolt through and engaging said other locking bar from the laterally outer side thereof and removably screwed into the boss.

5. An endless track unit comprising a plurality of links, means on alternate links for engagement with a supporting structure, each link including a tread plate and cooperating hooks on the tread plates at their ends connecting adjacent plates together in draft relationship, the hooks on the ends of each alternate plate being turned under such plate and facing each other and the hooks on the ends of the other plates between said alternate plates being turned over such other plates and facing each other; the cooperating hooks of adjacent plates being inherently disengageable from each other by longitudinal movement of said adjacent plates toward each other but arranged to allow the separation of said adjacent plates by transverse movement of one such plate relative to the other plate in one direction, and cooperating means on said adjacent plates preventing such disengagement of the hooks and the separation of said plates and including a removable member on one plate whose removal allows of such separation of the plates.

6. In an endless track unit which includes a pair of main links spaced apart and a secondary link spanning the space between the pair of main links, each link including a tread plate, cooperating coupling hooks on the plates at their adjacent ends, the cooperating hooks of adjacent plates being disengageable from each other by longitudinal movement of said plates toward each other and arranged to allow the separation of said adjacent plates by transverse movement of one such plate relative to the other plate in one direction, and cooperating means on said adajcent plates preventing such disengagement of the hooks and the separation of the plates; said means comprising a pair of transversely spaced longitudinally extending bars mounted on the plate of the secondary link, the end portions of said bars projecting into the path of longitudinal movement of the hooks of the main links and one of said bars being removable and when removed allowing of such separation of the plates.

References Cited in the file of this patent

UNITED STATES PATENTS

| | | |
|---|---|---|
| 1,308,308 | Sullivan | July 1, 1919 |
| 1,339,298 | Steele | May 4, 1920 |
| 1,367,820 | Knaggs | Feb. 8, 1921 |
| 1,822,132 | Davis | Sept. 8, 1931 |
| 2,470,801 | Boltman | May 24, 1949 |